UNITED STATES PATENT OFFICE.

ERNEST MEILI, OF HAWTHORNE, NEW JERSEY, ASSIGNOR TO WEIDMANN SILK DYEING CO., OF PATERSON, NEW JERSEY, A CORPORATION OF NEW JERSEY.

PROCESS OF REMOVING TIN FROM PHOSPHATE LIQUORS USED IN WEIGHTING SILK.

1,094,671. Specification of Letters Patent. Patented Apr. 28, 1914.

No Drawing. Application filed May 18, 1911. Serial No. 627,995.

*To all whom it may concern:*

Be it known that I, ERNEST MEILI, a citizen of the United States, residing at Hawthorne, in the county of Passaic and State of New Jersey, have invented a certain new and useful Process of Removing Tin from Phosphate Liquors Used in Weighting Silk, of which the following is a specification.

This invention relates to the weighting of silk by treating it first with a solution of bichlorid of tin and then with a solution of phosphate of soda. According to the present way of weighting silk by the use of these solutions the silk, already treated with the bichlorid of tin solution, is subjected to the phosphate of soda solution, whereupon the phosphate is extracted from the silk in any suitable way and reserved for use over again.

This process, although it involves conserving the phosphate of soda solution and hence represents an economy over the older method, consisting in dipping the silk, already treated with the bichlorid of tin solution, in the phosphate of soda solution and then, instead of conserving the solution held by the silk, allowing it to drain off and replenishing the phosphate of soda bath with fresh solution, possesses the disadvantage that the phosphate of soda liquor has the tendency to dissolve some of the tin oxid, so that tin phosphate accumulates more and more in the phosphate of soda bath the longer it is used, reducing the efficiency thereof and hence involving a waste of the materials used.

I have ascertained that the phosphate liquor, containing any amount of dissolved tin, may be chemically treated so as to effect precipitation of the tin, leaving the pure phosphate liquor free to be drawn off and hence used over again.

In carrying out my invention the phosphate liquor, containing any amount of the dissolved tin, is boiled with a small amount of silicate of soda, by which the tin becomes precipitated with the silicic acid, whereupon it is separated from the phosphate liquor by filtering. For example, the phosphate of soda liquor, say one thousand (1000) parts, four (4) degrees Bé., containing one (1) part of tin, or more, is boiled with four (4) parts of silicate of soda and, upon the resultant precipitation, is filtered. The result is a perfectly clear solution of phosphate of soda, substantially free of tin oxid. If the phosphate of soda solution is stronger than four (4) degrees Bé. the amount of silicate of soda is increased proportionately. The tin is precipitated principally as stannic acid; a small amount may be combined with phosphoric or silicic acid.

Having thus fully described my invention what I claim is:

1. The herein-described method of purifying the phosphate of soda solution employed in the weighting of silk by the so-called "tin-phosphate" method which consists in adding to the solution a reagent which reacts on the phosphate of soda and forms a precipitate which carries down with it the tin in the solution.

2. The herein-described method of extracting tin from the phosphate of soda solution employed in the weighting of silk by the so-called "tin-phosphate" method which consists in treating the solution with silicate of soda whereby to precipitate the tin, and then removing the precipitate, substantially as described.

3. The herein described method of extracting tin from the phosphate of soda solution employed in the weighting of silk by the so-called "tin-phosphate" method which consists in treating the solution with silicate of soda while hot, whereby to precipitate the tin, and then removing the precipitate, substantially as described.

4. A process for the regeneration of used phosphate baths employed in the weighting of silk, which consists in precipitating the tin and other metallic impurities in the bath by means of silicic acid.

5. The process for regenerating a phosphate bath that has been used in the weighting of silk, which consists in adding to said bath a chemical which will react with the bath to form nascent silicic acid which latter has the effect of precipitating the whole of the tin and other metallic impurities from the bath, as set forth.

6. A process for freeing a phosphate bath that has been used in the weighting of silk from tin and other metallic impurities which consists in adding to said bath a soluble silicate, and boiling the bath so treated.

7. A process for freeing a phosphate bath that has been used in the weighting of silk, from tin and other metallic impurities, which consists in adding silicate of soda to the bath, and then boiling the bath so treated.

In testimony whereof I affix my signature in presence of two witnesses.

ERNEST MEILI.

Witnesses:
JOHN W. STEWARD,
WM. D. BELL.